March 26, 1963  F. W. BROOKS  3,082,745
POWER BRAKE BOOSTER CONTROL VALVE MECHANISM
Filed Aug. 23, 1961  4 Sheets-Sheet 1

INVENTOR.
FRANK W. BROOKS
BY C.D.C. Staley
HIS ATTORNEY

INVENTOR.
FRANK W. BROOKS
BY
HIS ATTORNEY

INVENTOR.
FRANK W. BROOKS
BY D. C. Staley
HIS ATTORNEY

INVENTOR.
FRANK W. BROOKS
HIS ATTORNEY

United States Patent Office 3,082,745
Patented Mar. 26, 1963

3,082,745
POWER BRAKE BOOSTER CONTROL VALVE MECHANISM
Frank W. Brooks, Dayton, Ohio, assignor to General Motors Corporation, Detroit, Mich., a corporation of Delaware
Filed Aug. 23, 1961, Ser. No. 133,401
11 Claims. (Cl. 121—41)

This invention relates to a power brake booster, or a force producing device, for use on motor vehicles and particularly to a follow-up control valve mechanism controlling operation of the power brake booster or force producing device.

An object of the invention is to provide a power brake booster or force producing device with a follow-up control valve mechanism utilizing a resilient annulus member, or O-ring, as a valve seat element to seat upon annular valve elements to open and close passages controlling operating fluid to the power brake booster, the resilient annulus or O-ring being spring urged toward seating on the valve elements by means of an annular spring member operating on a ramp surface so that the resilient annulus is biased toward seating on the valve elements at all times.

Further objects and advantages of the present invention will be apparent from the following description, reference being had to the accompanying drawings wherein preferred embodiments of the present invention are clearly shown.

Figure 1:
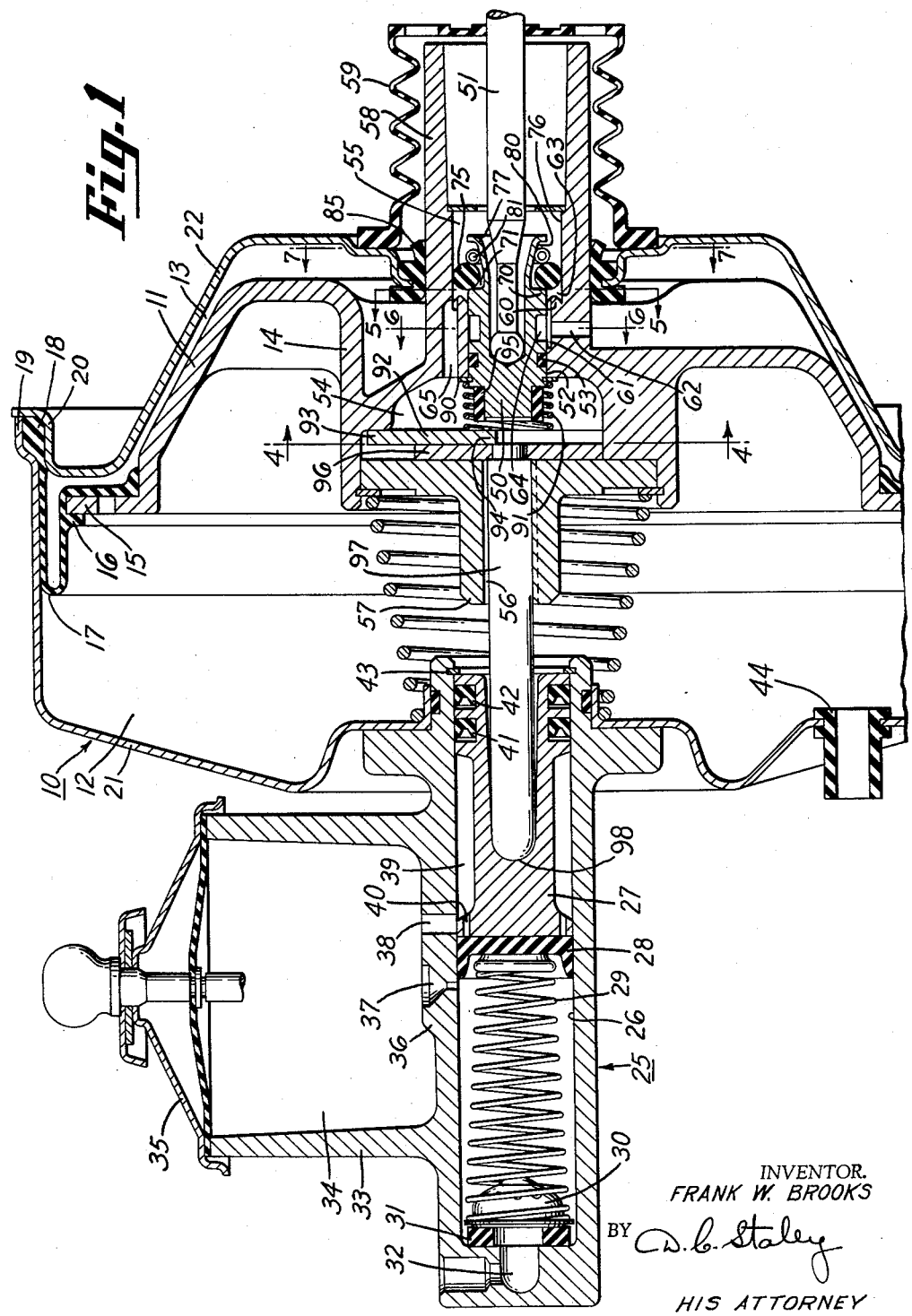
FIGURE 1 is a longitudinal cross-sectional view of a power brake booster or force producing device incorporating features of this invention.

In this invention the power brake booster or force producing device consists of a casing 10 having a pressure differential responsive movable wall 11 that divides the casing into a first compartment 12 and a second compartment 13 at opposite sides of the movable wall 11.

The movable wall 11 consists of a main body portion 14 that has a radial flange 15 to which the inner peripheral edge 16 of a rolling diaphragm 17 is attached, the outer peripheral edge 18 of the rolling diaphragm 17 being secured between the flange portions 19 and 20 of the casing elements 21 and 22 that provide the main casing or housing 10.

The forward wall 21 of the power brake booster carries a master cylinder 25 that has a cylinder bore 26 receiving a master cylinder piston 27. The piston 27 has a cup seal 28 at the forward end thereof engaged by a retraction spring 29, the opposite end of which spring engages a residual pressure check valve 30 that seats on an annular resilient ring 31, a discharge opening 32 being provided for supply of hydraulic fluid under pressure to the brakes of the motor vehicle.

The master cylinder 25 includes a reservoir 33 integral with the master cylinder having a reservoir chamber 34 closed by a suitable closure cap structure 35. The bottom wall 36 of the reservoir has a fill port 37 positioned just ahead of the forward edge of the cup seal 28 when the master cylinder piston is in the retracted position shown in FIG. 1 of the drawings. A second port 38 communicates with an annular space 39 around the master cylinder piston to prevent cavitation in the cylinder bore ahead of the master cylinder piston on a rapid retraction stroke, ports 40 being provided to allow fluid to flow from the annular chamber 39 forwardly into the cylinder bore 26.

The rearward end of the master cylinder piston 27 receives the secondary seals 41 and 42 to prevent loss of hydraulic brake fluid into the chamber 12 of the brake booster. A snap ring 43 is engaged by the master cylinder piston 27 when in the retracted position to limit its movement in a right-hand direction as viewed in the drawing.

Chamber 12 of the brake booster is continuously connected with a source of subatmosphere pressure, or vacuum, such as that obtained from the manifold of the engine of the vehicle, a suitable fitting 44 being provided for this purpose. Chamber 13 of the brake booster is adapted to have variable pressure applied to it from a pressure equivalent to that in chamber 12 up to atmosphere pressure, depending upon the control of delivery of atmospheric air into the chamber 13 under regulation of a follow-up control valve hereinafter described.

The follow-up control valve consists of a manually operable member 50 engaged by a plunger member 51 suitably connected to the brake pedal of a vehicle so that operation of the brake pedal will cause forward movement in a left-hand direction of the plunger 51 and thereby comparable movement of the manually operable member 50.

The manually operable member 50 is reciprocably slidable in an axial bore 52 provided in the body 14 of the movable wall 11. An O-ring seal member 53 prevents fluid communication between a chamber 54 at the left-hand end of the member 50 and a chamber 55 at the right-hand end thereof, chamber 54 being open to chamber 12 through passages 56 provided in the member 57 that forms a closure wall for the chamber 54. Chamber 55 is open to atmosphere through the extension 58 that extends from the opposite side of the movable wall 11. A dirt boot 59 encloses the wall extending portion 58 by engagement with the rod 51 at one end and engagement with the wall 22 of the casing 10 at the other end thereof.

The movable wall 11 has an annular valve element 60 formed thereon and is termed in this application as the first valve element, this valve element serving as a vacuum valve to control communication between chambers 12 and 13 when vacuum or subatmospheric pressure is present in chamber 12. The vacuum valve element 60 is positioned coaxially of the manual control member 50 and encircles the same and is spaced therefrom so that a pair of axially extending grooves 61 can be provided in the peripheral surface of the bore 52 for connection with ports 62 by which fluid pressure present in chamber 63 can be admitted to the chamber 13.

The manually operable member 50 has an annular groove 64 with which the peripheral slots or axial grooves 61 communicate. At the opposite side of the vacuum valve element 60 there is provided an axially extending groove 65 that connects chamber 63 outside the radial extent of the vacuum valve 60 with the chamber 54 that is in communication with the vacuum or subatmospheric chamber 12.

Thus, when the control valve is in the position shown in FIGURE 1, chamber 12 is in communication with chamber 13 of the brake booster through passage 56, chamber 54, passage 65, chamber 63, groove 61 and ports 62 so that the same pressure is present in chamber 13 as is present in chamber 12. At this time the brake booster or force applying device is inactive.

The manually controlled member 50 has an air valve element 70 formed at the corner of the periphery of the member 50 and an annular recess 71 and is termed a second valve element. An annular resilient rubber-like member 75 forms a valve seat element that engages the air valve element 70 normally as shown in FIGURE 1 of the drawings. This resilient annular member 75 is preferably in the form of an O-ring generally axially aligned with the coaxially arranged valve elements 60 and 70 with the left-hand face thereof engaging the annular valve element 70 and the outer radial periphery engaging the peripheral surface of the bore 76 that forms the atmospheric air chamber 55. Thus with the seat member 75 in the position shown in the drawing, atmospheric air is prevented from entering chamber 63 and thereby prevented from entering chamber 13 of the brake booster when the booster is in retracted position shown in FIGURE 1.

The manual control member 50 has an extension 77 provided with a peripheral surface 80 forming a ramp that is in the form of a truncated cone with the small diameter of the cone adjacent the air valve element 70. A helically coiled wire spring 81 that is in the form of an annulus is placed on the cone-shaped ramp surface 80 so that it normally tends to move down the ramp and engage the resilient annulus or O-ring 75 that forms the seat member to urge the seat member 75 against the air valve element 70 when the device is in the position shown in FIGURE 1, and to urge the seat member 75 against the vacuum valve element 60 when the manually controlled member 50 is moved in a left-hand direction in a manner hereinafter described.

From the foregoing description it will be apparent that the coil spring 81 provides passage means between the coils of the spring for flow of atmospheric air from the chamber 55 into the space between the ramp surface 80 and the seat member 75 so that when the air valve element 70 is disengaged from the seat member 75 when the valve member 50 is moved in the left-hand direction that atmospheric air can then pass into the chamber 63 and thereby find its way into the chamber 13 of the brake booster through passage 61 and port 62.

The extension 58 on the movable wall 11 is supported in a seal and support member 85 carried in the wall 22 of the casing 10.

Figure 4:
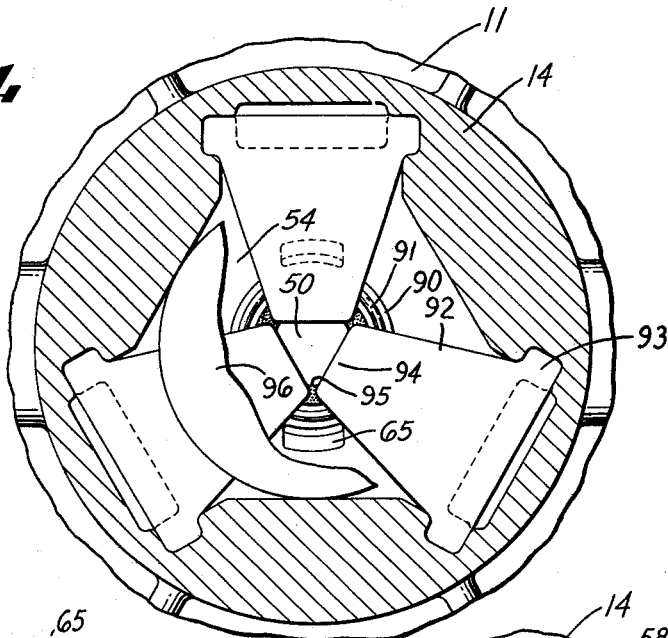
FIGURE 4 is a transverse cross-sectional view taken along the line 4—4 of FIGURE 1 illustrating the force reaction levers of the brake booster.
Figure 5:
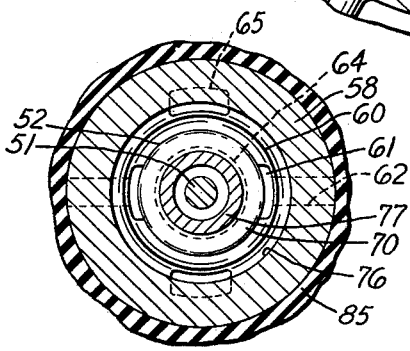
FIGURE 5 is a transverse cross-sectional view taken along line 5—5 of FIGURE 1 illustrating the valve mechanism.
Figure 6:
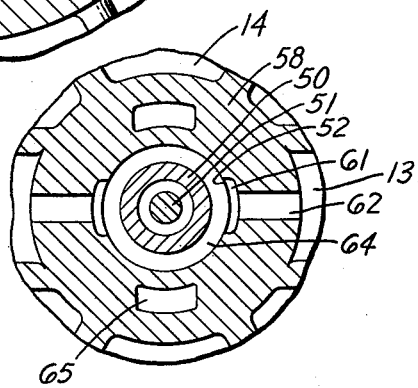
FIGURE 6 is a transverse cross-sectional view taken along line 6—6 of FIGURE 1.
Figure 7:
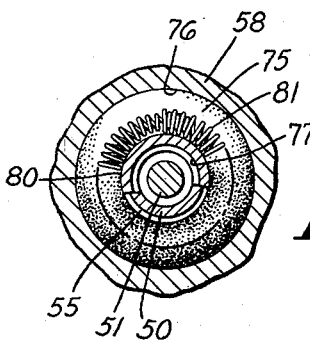
FIGURE 7 is a transverse cross-sectional view taken along line 7—7 of FIGURE 1.

The left-hand end of the manual control member 50 supports a snap ring 90 that is engaged by one end of a compression spring 91 that has its opposite end engaging a plurality of reaction levers 92. These levers 92 have their outer ends 93 pivotally carried on the body 14 of the movable wall, as shown in FIGURE 4, the inner ends 94 thereof being adapted to engage the left-hand end of the manual control member 50 through the resilient bump stop member 95.

The reaction levers 92 are engaged by a reaction disc 96 secured on the right-hand end of a force transmitting rod 97 that has its left-hand end engaging the bottom of a recess 98 provided in the master cylinder piston 27. The rod 97 therefore provides for transmission of power from the movable wall 11 of the brake booster and also provides for a reaction force transmitted through the disc 96 to the reaction levers 92 to proportion the reaction effect so transferred between the wall 11 and the manual control member 50 to give the operator a "feel" of the braking effect applied by the power brake booster.

The force producing device or brake booster as shown in FIGURE 1 is illustrated in the retracted or inactive position with equal subatmospheric pressure in chambers 12 and 13 of the casing 10 and with valve seat member 75 engaging the air valve element 70 to prevent admission of atmospheric air from chamber 55 into the power chamber of the brake booster.

Figure 2:
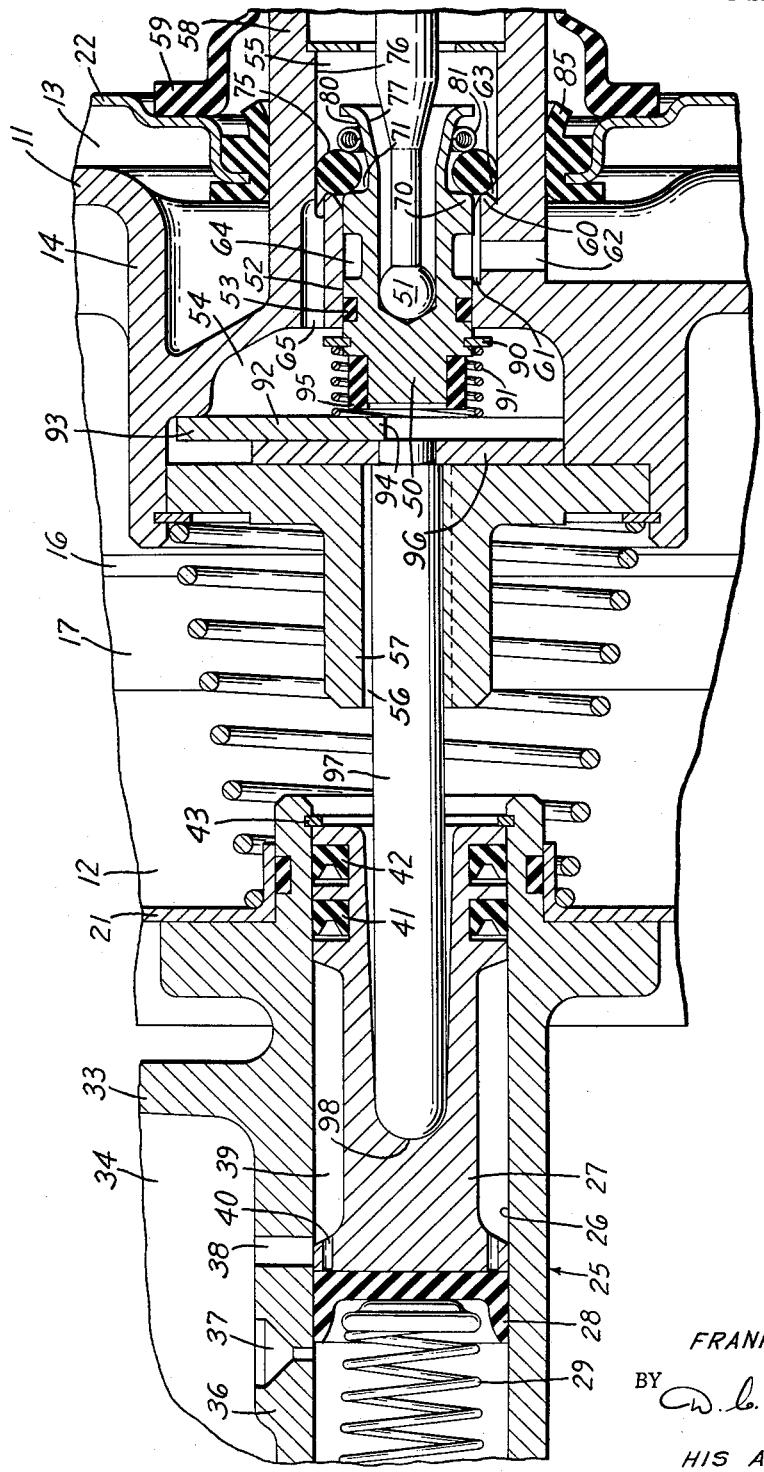
FIGURE 2 is a cross-sectional view of a portion of the apparatus illustrated in FIGURE 1 showing the control valve mechanism in a lapped position.
Figure 3:
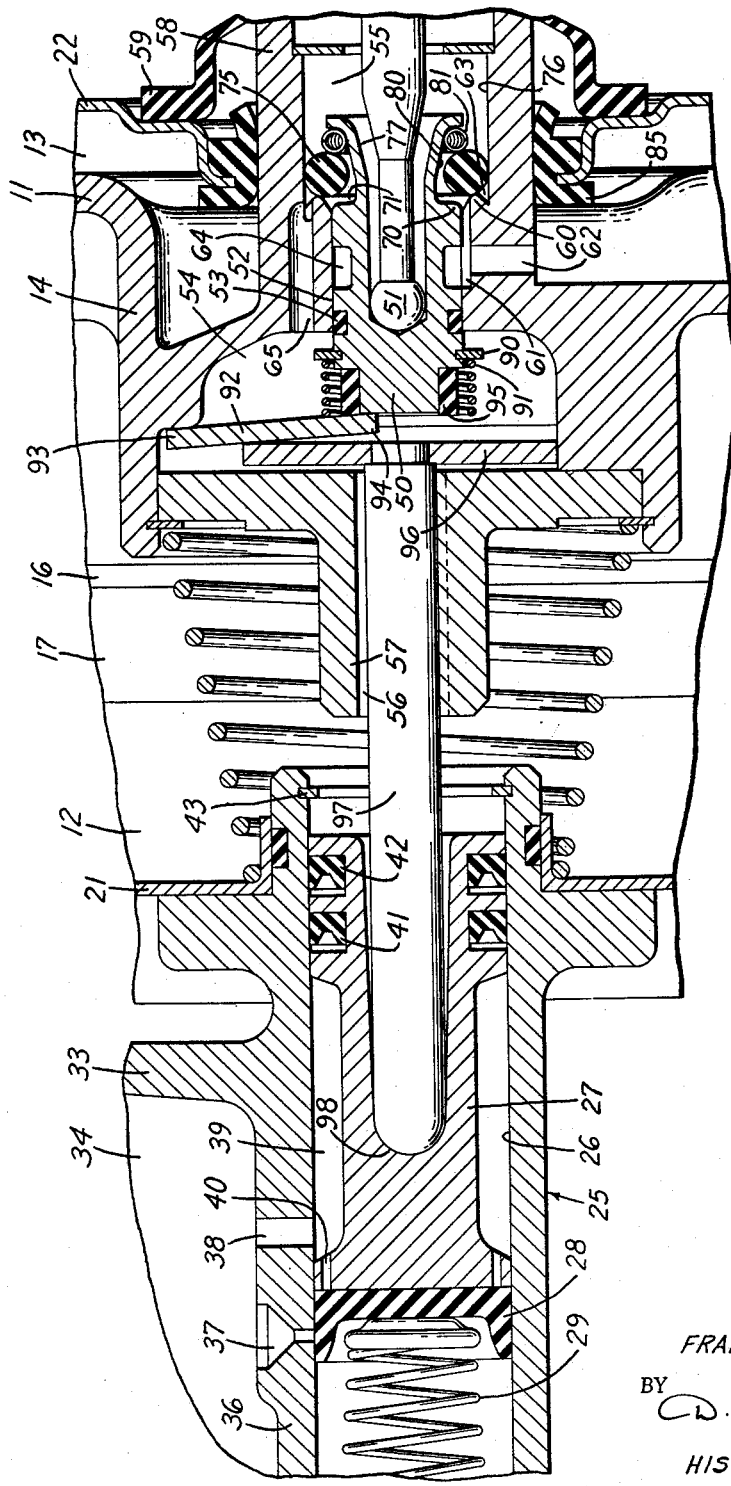
FIGURE 3 is a cross-sectional view similar to FIGURES 1 and 2 but showing the control valve mechanism in an "apply" position as distinguished from the "at rest" position of the mechanism shown in FIGURE 1.

In operation, when the operator of the vehicle applies a brake force to the brake pedal, plunger 51 will be moved in the left-hand direction, as viewed in the drawings. As plunger 51 moves in the left-hand direction, manual control member 50 is also moved in a left-hand direction until the valve seat member 75 engages the vacuum valve element 60, as shown in FIGURE 2. It will be understood that seat member 75 continuously provides sealing engagement with the periphery 76 of the axial bore in the movable wall to prevent fluid communication between the atmospheric air chamber 55 and the axial passages 65 in the movable wall. Thus when the seat member 75 engages the vacuum valve element 60, communication of vacuum or subatmospheric pressure between the chambers 12 and 13 is cut off since axial passage 61 is no longer in communication with the axial passage 65, vacuum valve element 60 being positioned radially between these two axially extending passages.

As the manual control member 50 is continued to be moved forward against the action of the spring 91, valve seat member 75 will remain seated on the vacuum valve element 60 and the air valve element 70 will be disengaged from the periphery of the resilient annulus 75. When this occurs, chamber 13 of the brake booster is connected with atmosphere in the chamber 55 by way of passages through the coil spring 81, past the passage between the resilient annulus 75 and the ramp surface 80, past the now disengaged air valve element 70 for atmosphere fluid flow into the axial passages 61 that connect with the port 62 for delivery of atmosphere pressure into the chamber 13 of the brake booster.

The increase in fluid pressure in the chamber 13 will cause the movable power wall of the brake booster to move in a left-hand direction and thereby move the master cylinder 27 in a forward or left-hand direction to displace hydraulic brake fluid to the brakes of the vehicle through the discharge ports 32, residual pressure check valve 30 allowing the brake fluid to pass through the same to the discharge port 32.

As hydraulic fluid pressure develops in the master cylinder bore 26 ahead of the master cylinder piston, the force effect of the hydraulic fluid is applied to the master cylinder piston that tends to move the reaction disc 96 in a right-hand direction against the reaction levers 92 so that they are pivoted about their outer ends with their inner ends engaging the left-hand end of the manual control member 50. The result is that a portion of the reaction effect is transferred to the manual control member 50 and thereby transmitted to the foot of the operator as brake "feel."

When the force effect applied by the operator is balanced by brake pressure, the manual control member 50 will move forward slightly until the air valve element 70 again engages seat member 75 in the position shown in FIGURE 2.

While the embodiments of the present invention as herein disclosed constitute preferred forms, it is to be understood that other forms might be adopted.

What is claimed is as follows:

1. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby; said control valve mechanism including, a first annular valve element, a second annular valve element on a member movable relative to said first valve element, and a resilient annulus of rounded cross-section forming a valve seat member movable with respect to one of the valve elements, and the other of the valve elements and the member on which the other valve element is carried being movable with respect to said valve seat member, said valve seat member being engageable with both said valve elements for annular seating thereon, and spring means urging said seat member toward seating on the respective valve element engaged thereby.

2. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby; said valve mechanism including, a first annular valve element, a second annular valve element formed on a member movable relative to said first valve element, a resilient O-ring valve seat member movable with respect to one of the valve elements, the other of the valve elements and the member on which the other valve element is carried being movable with respect to said valve seat member, said valve seat member being engageable with both said valve elements for annular seating thereon, and spring means urging said seat member towards seating on the respective valve element engaged thereby.

3. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby; said valve mechanism including, a first annular valve element, a second annular valve element formed on a member movable relative to said first valve element, a resilient annulus forming a valve seat member carried on said movable member and movable axially thereon, said valve seat member being movable with respect to one of the valve elements, the other of the valve elements and the member on which said valve seat member being carried is movable with respect to said one valve element, said valve seat member being engageable with both said valve elements for annular seating thereon, and spring means on said movable member urging said seat member axially toward seating on the respective valve element engaged thereby.

4. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby, including, a first annular valve element, a second annular valve element formed on a member movable relative to said first valve element, said movable member having an annular ramp surface thereon adjacent said second valve element, a resilient O-ring valve seat member carried on said movable member encircling said ramp surface and movable axially thereon, said valve seat member being movable with respect to one of the valve elements, the other of the valve elements and the member on which said valve seat member being carried is movable with respect to said valve seat member, said valve seat member being engageable with both said valve elements for annular seating thereon, and coil spring means in the form of an annulus on said movable member on said ramp surface and movable axially thereon biasing said seat member axially toward seating on the respective valve element engaged thereby.

5. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby, including, a manually operable member slidable axially in an opening in said movable wall, a first annular valve element on said movable wall encircling said manually operable member, a second annular valve element formed on said manually operable member coaxial with and radially inward of said first valve element, a resilient annulus on said manually operable member forming a valve seat member encircling said manually operable member adjacent said second annular valve element and movable axially on said manually operable member into engagement with both said valve elements, and spring means on said manually operable member urging said valve seat member axially toward said valve elements for engagement therewith selectively on movement of said manually operable member reciprocably in said opening in said movable wall.

6. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby, including, a manually operable member slidable axially in an opening in said movable wall, a first annular valve element on said movable wall encircling said manually operable member, a second annular valve element formed on said manually operable member coaxial with and radially inward of said first valve element, an annular ramp surface on said manually operable member adjacent said second valve element, a resilient annulus on said manually operable member forming a valve seat member encircling said ramp surface adjacent said second valve element and movable axially relative to said manually operable member, and a coil spring in the form of an annulus in encircling engagement with said ramp surface biasing said valve seat member axially toward seating of said seat member on said valve elements.

7. Apparatus constructed and arranged in accordance with the structure set forth in claim 6 wherein said resilient annulus comprises an O-ring and said ramp surface on said manually operable member is in the form of a truncated cone with the small diameter portion thereof adjacent said second annular valve element.

8. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby, including, a manually operable member reciprocably slidable axially in an axially extending opening in said movable wall, a first annular valve element on said movable wall within said opening and encircling said manually operable member, a second annular valve element formed on said manually operable member reciprocable relative to said first valve element, an annular ramp surface on said manually operable member adjacent said second valve element, a resilient annulus forming a valve seat member adjacent said second valve element and encircling said ramp surface, said resilient annulus having a surface portion sealingly engaging the peripheral surface of said opening in said movable wall adjacent said first valve element and movable axially with and on said manually operable member for engagement and disengagement with said valve elements on reciprocal movement of said manually operable member in said opening in said movable wall, and spring means in the form of an annluus engagingly encircling said ramp surface and engaging said resilient annulus biasing the same axially against said valve elements and radially against said peripheral surface of said opening in said movable wall.

9. Apparatus constructed and arranged in accordance with the structure set forth in claim 8 wherein said resilient annulus comprises an O-ring and said ramp surface is in the form of a truncated cone with the small diameter portion thereof adjacent said second valve element.

10. Apparatus constructed and arranged in accordance with the structure set forth in claim 8 wherein said spring means is in the form of a helically wound wire spring to provide passages therethrough for a fluid medium to a clearance space provided betwen said resilient annulus and said ramp surface for flow to the pressure producing device when said second valve element is disengaged from said resilient annulus.

11. In a force producing device, a fluid pressure operated motor including a casing having a pressure differential responsive movable wall operable therein, a follow-up control valve mechanism carried by said wall having one position to establish equivalent pressures on opposite sides of the wall to render the same inactive and a second position to establish differential pressures on opposite sides of the wall to render the same active to effect a force applying stroke thereby, including, a manually operable member reciprocably slidable axially in an axially extending opening in said movable wall, an annular groove in said member in connection with chamber means at one side of said movable wall, a first annular valve element on said movable wall within said opening and encircling said manually operable member, a first passage at one side of said first valve element in connection with chamber means at the opposite side of said movable wall and second passage means at the opposite side of said first valve element in connection with said groove in said manually operable member, a second annular valve element formed on said manually operable member reciprocable relative to said first valve element, an annular ramp surface on said manually operable member adjacent said second valve element, a resilient annulus forming a valve seat member adjacent said second valve element and encircling said ramp surface in spaced relation thereto, said resilient annulus having a surface portion sealingly engaging the peripheral surface of said opening in said movable wall adjacent said first valve element and movable axially with and on said manually operable member for engagement and disengagement with said valve elements on reciprocal movement of said manually operable member in said opening in said movable wall, and coil spring means in the form of annulus engagingly encircling said ramp surface and engaging said resilient annulus biasing the same axially against said valve elements and radially against said peripheral surface of said opening in said movable wall, said spring means and the space between the said resilient annulus and said ramp surface providing passage means connecting said groove and said second passage means with a fluid pressure source when said second valve element is disengaged from said resilient annulus.

References Cited in the file of this patent
UNITED STATES PATENTS

| | | |
|---|---|---|
| 2,743,707 | Kellersman | May 1, 1956 |
| 2,826,042 | Rike et al. | Mar. 11, 1958 |
| 2,914,035 | Banker | Nov. 24, 1959 |